March 2, 1937.　　　　P. MUNSCH　　　　2,072,718
AUTOMATIC DISCHARGE DEVICE FOR ROASTERS
Filed Sept. 29, 1936
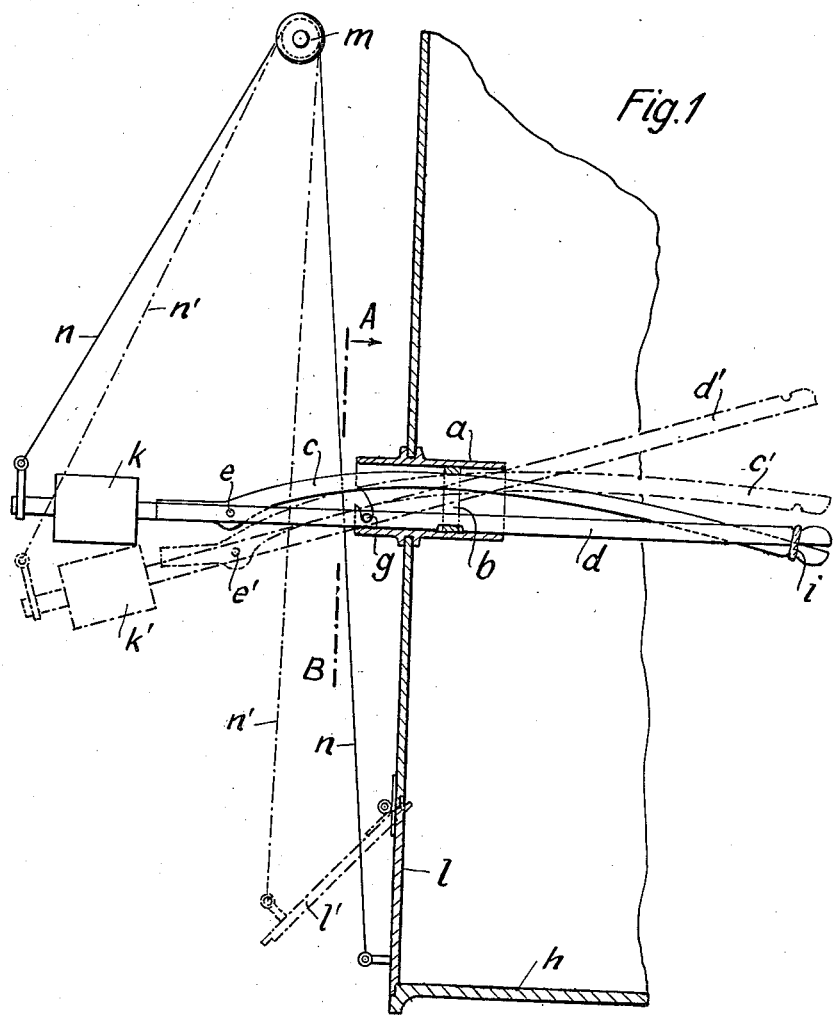
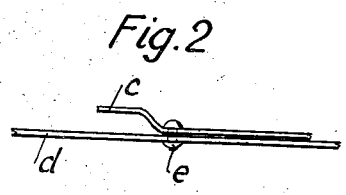
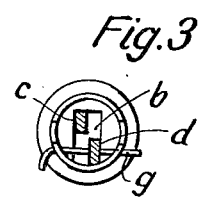
Inventor:
Pierre Munsch
by: *signature*
　　　attorney Patented Mar. 2, 1937

2,072,718

UNITED STATES PATENT OFFICE 2,072,718

AUTOMATIC DISCHARGE DEVICE FOR ROASTERS

Pierre Munsch, Guebwiller, France

Application September 29, 1936, Serial No. 103,145
In Germany August 31, 1935

3 Claims. (Cl. 34—5)

The present invention relates to an automatic discharge device for the containers of roasters for treating coffee and like products.

In coffee roasters in which the grains are automatically supplied to be discharged when the roasting process is completed, it has been proposed to predetermine the duration of the roasting by means of a counter. Such devices present the drawback that, for a determined product to be treated, said devices have no influence at all with respect to the heating degree required or for determining the duration of the roasting process.

This drawback has been eliminated by providing, inside the container of the product to be roasted, a thermometer or the like, of which the column of mercury operates a contact adapted to close an electric circuit when a determined temperature is reached. This circuit is in connection with an electric device adapted to operate a signal or to start a device for discharging the charge of the roaster container. Such installation, however, presents the drawback that it is of excessively complicated construction and that only a most difficult adjustment and a continuous careful surveyance will give efficient results; furthermore, such devices cannot be installed upon the existing roasters.

This drawback is eliminated by the present invention. According to this, the discharge device is constituted by scissors introduced in the roaster container, the shanks of said scissors being held together by a binding means or the like, said scissors being opened when the binding means are burnt or detached, so that the shanks are moved from each other, whereby the discharge flap of the container will be opened for the discharge of the roasted product.

In the accompanying drawing, one form of embodiment of the object of the invention has been diagrammatically illustrated.

Fig. 1 is a front elevation, partly in section, of the device;

Fig. 2 is a partial plan view thereof;

Fig. 3 is a section on line A—B of Fig. 1.

In the opening $a$ (Fig. 1), provided upon the roaster container $h$ for the passage of the sample-taking means, is introduced a slotted stopper $b$ (Fig. 3), and in this stopper are introduced scissors constituted by the shanks $c$ and $d$. The shank $c$ is linked to the shank $d$ by means of the pivot spindle $e$ (Fig. 2). The shank $d$ itself is for instance pivotally mounted upon the spindle $g$ in a notch of the sleeve $a$.

The ends of the shanks located inside the roaster container $h$ are provided with notches around which may be wound a binding strip $i$ or the like, for the purpose of holding the scissors closed. The end of the shank $d$ located outside is provided with an adjustable counterweight $k$ and connected with the flap $l$ of the roaster container $h$, for instance by means of a chain $n$ passing over a roller $m$.

When now the product to be roasted has reached the accurate temperature at which the roasting process should be interrupted, the binding strip $i$ will be burnt, the scissors will be opened and, owing to the counterweight $k$, will now come in the position $c'$, $d'$, illustrated in the drawing by dotted lines. The weight now positioned in $k'$ thereby causes, by a traction upon the chain $n$, the opening of the discharge flap $l$, in $l'$, of the roaster container.

The roasted product is now discharged by means of the rotary vanes provided inside the container.

Obviously, the binding strip will be so selected that it will only be burnt when the roasting temperature for the particular product under treatment will be reached.

Instead of a binding strip, use may be made of a ring which becomes detached under the action of a determined temperature.

If it is desired, in certain cases, to use binding strips of one and the same strength or the same rings for such goods which are differently influenced during the roasting process, the burning of the binding strips may be retarded, according to experiments, by the fact of incompletely filling the container of the roaster.

Furthermore, provision can be made of a device by means of which the opening of the discharge flap will operate the interruption of a heating source, thus for instance in electric heating installations the current will be interrupted, or with gas burners the delivering cock may be closed.

I claim:

1. An automatic discharge device for roasters, comprising a pair of scissors arranged to penetrate over a certain distance through an opening inside the roaster container, the scissors being pivotally mounted by one of the shanks to the container wall, so that the scissors remain normally open, a binding means engaging the ends of the shanks inside the container to hold the scissors closed, said binding means being adapted to release the shanks when a determined temperature is reached in the roaster container, a discharge flap provided in the container wall, a connection between the discharge flap and one shank of the scissors, the arrangement being such that the opening of the scissors causes the opening of the discharge flap.

2. An automatic discharge device for roasters, comprising a pair of scissors arranged to penetrate over a certain distance through an opening inside the roaster container, the scissors being pivotally mounted by one of the shanks to the container wall, so that the scissors remain normally open, an adjustable counterweight arranged upon one of the shanks for influencing the opening of the scissors, a binding means engaging the ends of the shanks inside the container to hold the scissors closed, said binding means being adapted to release the shanks when a determined temperature is reached in the roaster container, a discharge flap provided in the container wall, a connection between the discharge flap and one shank of the scissors, the arrangement being such that the opening of the scissors causes the opening of the discharge flap.

3. An automatic discharge device for roasters, comprising a pair of scissors arranged to penetrate over a certain distance through an opening inside the roaster container, a slotted plug fitting in the opening, the scissors being pivotally mounted in the slotted plug so that they remain normally open, a binding means engaging the ends of the shanks inside the container to hold the scissors closed, said binding means being adapted to release the shanks when a determined temperature is reached in the roaster container, a discharge flap provided in the container wall, a connection between the discharge flap and one shank of the scissors, the arrangement being such that the opening of the scissors causes the opening of the discharge flap.

PIERRE MUNSCH.